Patented Aug. 1, 1933

1,920,297

UNITED STATES PATENT OFFICE 1,920,297

CROTYL CELLULOSE AND CROTYL CELLULOSE COMPOSITIONS

Harry B. Dykstra, Wilmington, Del., assignor to E. I. du Pont de Nemours & Company, Wilmington, Del., a Corporation of Delaware No Drawing. Application July 25, 1930
Serial No. 470,772

10 Claims. (Cl. 134—79.)

This invention relates to unsaturated ethers of cellulose. More specifically the invention relates to crotyl cellulose and to compositions containing crotyl cellulose.

In the copending application of Dr. Frederick C. Hahn, Serial No. 460,787, filed June 12, 1930, crotyl cellulose and a method of preparing it are disclosed. Crotyl cellulose, as described in the said application is straw colored and resinous in appearance. It can be obtained as a light colored powder by dissolving it in alcohol and pouring the solution into water or petroleum ether. When freshly prepared, it is readily soluble in ethyl alcohol, butyl alcohol, acetone, ethyl acetate, butyl acetate, benzene, toluene, and xylene. Although it is substantially insoluble in aliphatic hydrocarbons, these hydrocarbons may be used as diluents in solutions of crotyl cellulose in active solvents.

Crotyl cellulose gives clear films which become dust-free in about 15 minutes, tack-free within two days, and hard-dry in four days. After a week's aging, the films are very hard and are noticeably less soluble in ethyl acetate than when they first become dry. The films also become less soluble in other solvents for freshly prepared crotyl cellulose. At the end of two weeks aging at ordinary temperatures, the films are substantially insoluble in ethyl acetate. These films are hard and tough and have excellent color stability both on heating and on exposure to ultra-violet light. They are superior to cellulose nitrate films in being less flammable, and in adhesion to surfaces such as are presented by metals and glass. Their water resistance is much superior to that of cellulose acetate films.

When crotyl cellulose films are heated at 100° C., they become tack-free within thirty minutes and are quite hard in sixty minutes. After four hours heating at 100° C. the films are much less flexible than when they first become tack-free. After 24 hours baking at this temperature the films are only slightly affected by ethyl acetate and after forty-eight hours' baking they are substantially insoluble.

Ultra-violet light also accelerates the change to the insoluble form which crotyl cellulose films undergo. On exposing films of crotyl cellulose to ultra-violet light for eighteen hours they become noticeably less soluble in ethyl acetate than similar films kept in diffused light. After three days' exposure to ultra-violet light the films are practically insoluble in ethyl acetate, whereas films aged in diffused light require about two weeks to reach this degree of insolubility.

Crotyl cellulose is compatible with a number of resins, oils, cellulose derivatives including cellulose nitrate, and softeners. This makes it possible to modify the properties of its films in many ways. The use of a softener, e. g., dibutyl phthalate, tricresyl phosphate, or castor oil in crotyl cellulose films slows up their drying rate and retards their change to the insoluble form. However, the resultant films remain flexible for a much longer period than those containing only crotyl cellulose. The incorporation of resins, for example, rosin, damar, or resins of the polyhydric alcohol-polybasic acid type gives films which dry more rapidly than those of crotyl cellulose and which show better adhesion to metals, glass, and wood. The incorporation of drying oils gives hard, tough films which dry satisfactorily and become insoluble fairly rapidly.

It is an object of this invention to improve the drying of crotyl cellulose and of coating compositions containing crotyl cellulose. Another object of the invention is to accelerate the change of crotyl cellulose alone, or in compositions, from the relatively soluble to the relatively insoluble form. Other objects of the invention will be in part apparent and in part set forth hereinafter.

These objects are accomplished, generally speaking, by the use of a drier.

I have discovered that if a drier such as a metallic soap or mixtures of metallic soaps be incorporated with crotyl cellulose, or be incorporated in a crotyl cellulose composition, the rate at which the crotyl cellulose or the crotyl cellulose composition dries, and the rate at which the change to the insoluble form occurs, is very considerably accelerated. Amounts of drier containing a weight of metal equal to between .001% and 2% of the crotyl cellulose are generally sufficient, but less or more may be used if the occasion requires.

By "drying" as used in the claims is meant the hardening of the composition and also the change to the insoluble form.

Films of crotyl cellulose containing cobalt oleate drier become dust-free in eight minutes, tack-free in sixty minutes, and hard-dry in six hours when dried at ordinary temperatures. After six hours the films containing drier are less affected by ethyl acetate than films of crotyl cellulose which contain no drier and which have been aged at room temperature for six days. After twenty-four hours films containing a drier are only slightly affected by ethyl acetate. When baked at about 100° C. films of crotyl cellulose containing a cobalt oleate drier become tack-free within thirty minutes and hard-dry within sixty minutes. If the heating be continued at this temperature for approximately two hours the films will be found to be practically insoluble in ethyl acetate.

The ability to use a drier with crotyl cellulose is found to be very advantageous when drying oils are incorporated with the crotyl cellulose.

The following examples illustrate the invention. It is to be understood that these examples are merely illustrative and are not in any sense limitative.

*Example I*

| | Parts |
|---|---|
| Crotyl cellulose | 40 |
| Cobalt oleate (2.67% cobalt) | 5 |
| Ethyl acetate | 45 |
| Butyl acetate | 40 |
| Toluene | 35 |

Films of this lacquer when air-dried became dust-free in eight minutes, tack-free in sixty minutes, and hard-dry within six hours. After six hours' drying the film was less affected by ethyl acetate and other solvents than a similar film without a drier which had been exposed to air for six days. When films of the crotyl cellulose lacquer containing drier were baked at 100° C., they became tack-free in thirty minutes and hard-dry in sixty minutes. After two hours' heating at this temperature the films were substantially insoluble in lacquer solvents.

*Example II*

| | Parts |
|---|---|
| Crotyl cellulose | 8 |
| Blown linseed oil | 8 |
| Drier solution (containing 2.67% cobalt) | 1 |
| Toluene | 30 |
| Ethyl acetate | 20 |
| Butyl acetate | 12 |

Films of this lacquer became tack-free within twelve hours on aging at 20°–30° C., and became tack-free within forty-five minutes when baked at 100° C. These films became insoluble in ordinary lacquer solvents after a few days' exposure to air.

*Example III*

| | Parts |
|---|---|
| Crotyl cellulose | 10 |
| Cellulose nitrate | 3 |
| Dibutyl phthalate softener | 2 |
| Blown linseed oil | 4 |
| Cobalt oleate drier solution (2.67% cobalt) | 0.5 |
| Zinc oxide pigment | 7 |
| Ethyl acetate | 40 |
| Butyl acetate | 15 |
| Toluene | 10 |

The rate at which a coating composition of this type dries can be regulated by varying the quantities of plasticizer and drier. An increase in the quantity of plasticizer will tend to retard drying, whereas an increase in the quantity of drier will tend to accelerate drying. The relative amounts of plasticizer and drier which are most advantageous will vary with the particular coating composition.

This invention will be found applicable not only to crotyl cellulose but also in greater or less degree to the other unsaturated aliphatic ethers of cellulose such as allyl cellulose.

Any drier which has been found useful with drying oils is also useful with crotyl cellulose. These driers are generally classifiable as metallic soaps and include among other substances the salts of iron, manganese, lead, and cobalt with acids such as oleic, abeitic, linoleic and stearic. These driers may be used singly or in combination.

As many apparently widely different embodiments of this invention may be made without departing from the spirit and scope thereof, it is to be understood that I do not limit myself to the specific embodiments thereof except as defined in the appended claims.

I claim:

1. A composition comprising crotyl cellulose and a drier.
2. A composition comprising crotyl cellulose and a metallic soap drier.
3. A composition comprising crotyl cellulose, another film-forming material, and a drier.
4. A composition comprising crotyl cellulose, a cellulose derivative, and a drier.
5. A composition comprising crotyl cellulose, a drying oil, and a drier.
6. A composition comprising crotyl cellulose, a softener, and a drier.
7. The method of drying a composition comprising crotyl cellulose consisting in heating it in the presence of a drier.
8. The method of drying a composition comprising crotyl cellulose consisting in heating it in the presence of a drier and under the influence of actinic light.
9. A composition comprising allyl cellulose and a drier.
10. A composition comprising an unsaturated cellulose ether from the group consisting of crotyl cellulose and allyl cellulose, and a drier.

HARRY B. DYKSTRA.